United States Patent [19]

Brandenberg

[11] 4,220,361
[45] Sep. 2, 1980

[54] CONNECTOR FOR PLASTIC TUBING

[75] Inventor: Karl A. Brandenberg, Chehalis, Wash.

[73] Assignee: The Aro Corporation, Bryan, Ohio

[21] Appl. No.: 8,525

[22] Filed: Feb. 1, 1979

[51] Int. Cl.² ............................................. F16L 21/06
[52] U.S. Cl. .............................. 285/323; 285/DIG. 22
[58] Field of Search ............... 285/323, 322, 216, 196, 285/DIG. 22

[56] References Cited

U.S. PATENT DOCUMENTS

| 1,799,941 | 4/1931 | Wulle | 285/323 |
| 3,248,135 | 4/1966 | Meripol | 285/323 |
| 4,005,883 | 2/1977 | Guest | 285/322 |
| 4,083,586 | 4/1978 | Helm | 285/323 |

FOREIGN PATENT DOCUMENTS 2413750  11/1974  Fed. Rep. of Germany ........... 285/323

Primary Examiner—Thomas F. Callaghan
Attorney, Agent, or Firm—Allegretti, Newitt, Witcoff & McAndrews

[57] ABSTRACT

An improved fitting for releasably connecting a plastic tube to a fluid logic element includes a ring member and a cooperating collet member. The collet member is generally cylindrical with a rigid collar at each end connected by an elastically deformable body section. A throughbore through the collet member includes barbs within the throughbore for gripping a plastic tube inserted in the throughbore. Outwardly extending projections from the middle of the body cooperate with cam surfaces of the ring member as the collet member is inserted into the ring member thereby controlling release of the plastic tube and insuring retention of the tube in the throughbore.

12 Claims, 5 Drawing Figures

U.S. Patent        Sep. 2, 1980        4,220,361
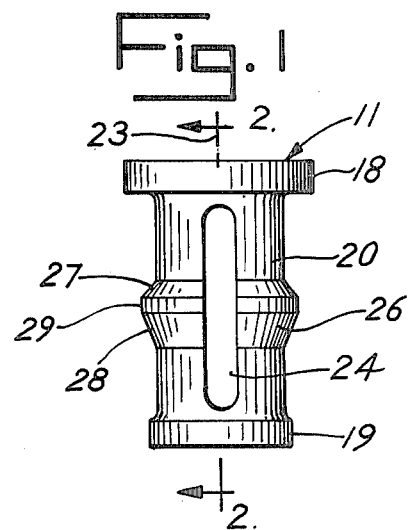
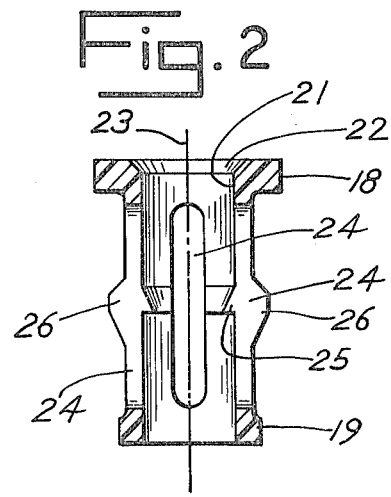
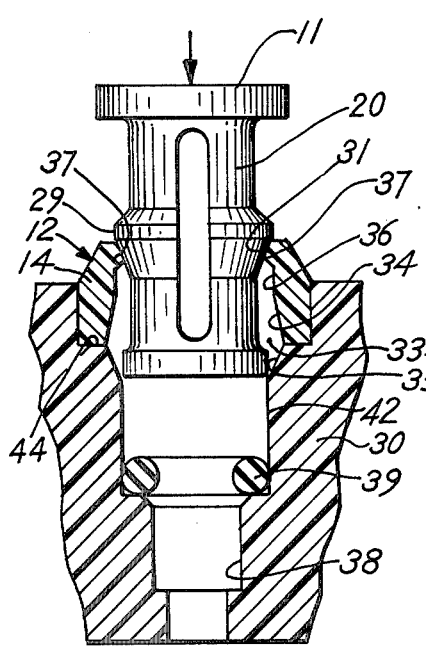
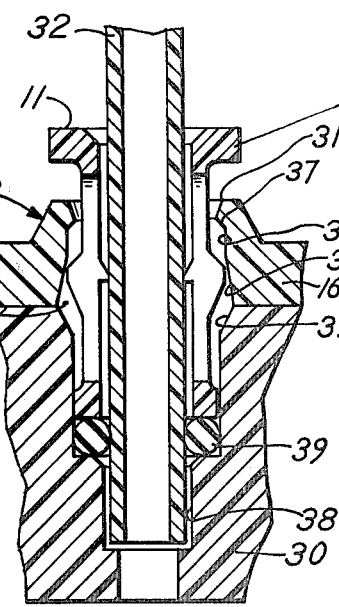
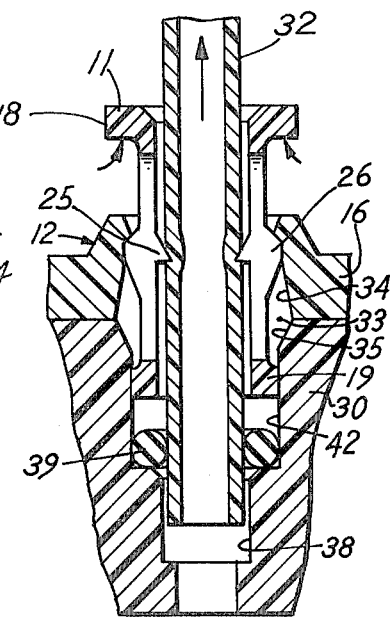

CONNECTOR FOR PLASTIC TUBING

BACKGROUND OF THE INVENTION

This invention relates to an improved connector for attaching plastic tubing to a fixture.

Flexible plastic tubing is commonly used to carry fluids such as pressurized air in pneumatic logic control systems. Connecting the flexible plastic tubing to logic control elements or pneumatic equipment can be a time consuming and expensive task. Replacement of the tubing or an element may also be very time consuming. Heretofore there have been many types of plastic tube connection assemblies that have been patented or available in the marketplace. Typical of the prior art plastic tube connection systems are those disclosed in U.S. Pat. No. 3,572,772; U.S. Pat. No. 3,743,326; U.S. Pat. No. 3,653,689; U.S. Pat. No. 3,454,290; U.S. Pat. No. 3,214,200; French Pat. No. 2,012,796; U.S. Pat. No. 3,637,240; Italian Pat. No. 626,546; Italian Pat. No. 569,632; U.S. Pat. No. 3,336,055; U.S. Pat. No. 2,092,358; U.S. Pat. No. 3,076,473; and French Pat. No. 1,183,003.

Additionally, a known commercial product is a connector manufactured by Virgo Fluid Power, Norton, Mass. and sold under the trademark "Tube-Ins." The "Tube-Ins" connector includes a collar which fits over the plastic tubing. A plurality of legs extend from the collar and are wedged against the collar upon insertion of the collar and tubing into a cooperative opening. The "Tube-Ins" connector is purported to be easily releasable.

Another popular product is disclosed in U.S. Pat. No. 3,653,689, referenced above. The product is sold under the trademark "Legris." The "Legris" product also includes a collar which fits over a tube. A number of flexible legs project from the collar and cooperate with a counterbore opening to hold the tube in position with respect to some device or element. The plastic tube is released by spreading the flexible legs to disengage them from the tube.

The referenced prior art devices allow easy connection and disconnection of plastic tubing and have excellent tube retention and sealing characteristics. However, the cost of such fittings is relatively high. This is a result of the precision machining operations required in the manufacture of such products as well as the materials which are required for the manufacture of such products. Improved, less costly connectors are therefore desired.

SUMMARY OF THE INVENTION

Briefly, the present invention comprises an improved connector or fitting for attachment of plastic tubing to a fixture. The improved fitting is less costly than known prior art fittings due to fabrication of the fitting from plastic material. As a result the fitting or connector may be manufactured by molding processes. The improved fitting includes a collet member and a cooperative ring member. The collet member has an elongated body with a collar at each end of the body. The body is elastically deformable and preferably includes a number of longitudinal slots. A throughbore through the body includes inwardly projecting barbs for gripping a plastic tube inserted in the throughbore. Outward projections from the body cooperate with the ring member and more particularly a detent in the ring member by elastically deforming the body to cause the body to grip the plastic tubing in the throughbore. Quick release of the plastic tubing is effected by disengaging the collet body projections from the ring member.

Thus, it is an object of the present invention to provide an improved fitting or connector for retention of plastic tubing.

A further object of the present invention is to provide an improved fitting which is easy to manufacture and less expensive than various known prior art fittings.

Another object of the present invention is to provide an improved fitting which is manufactured from a plastic material.

Still a further object of the present invention is to provide an improved fitting which is easy to assemble and which, when assembled, provides good sealing and holding characteristics.

These and other objects, advantages and features of the invention will be set forth in the detailed description which follows.

BRIEF DESCRIPTION OF THE DRAWING

In the detailed description which follows reference will be made to the drawing comprised of the following figures:

FIG. 1 is a plan view of the collet member of the improved fitting of the present invention;

FIG. 2 is a cross sectional view of the collet member of FIG. 1 taken substantially along the line 2—2;

FIG. 3 is a plan view of the collet member of FIG. 1 upon insertion into a ring member;

FIG. 4 is a plan view similar to FIG. 3 illustrating the manner in which plastic tubing is positioned within the fitting; and FIG. 5 is a plan view similar to FIG. 4 illustrating the improved fitting of the present invention in the tube retention position.

DESCRIPTION OF THE PREFERRED EMBODIMENT

Referring to the figures, the improved fitting of the present invention includes a collet member 11 and a cooperating ring member 12. The collet member 11 is fabricated from a molded plastic material which is elastic. The ring member 12 may be integrally formed with a fixture or fluid element 30, for example, or it may be a separate member 14 or plate 16 cooperative with an element 30 as shown in FIGS. 3 and 4 respectively and described in greater detail below. The ring member 12 may be made from any rigid, non-elastic material including molded plastic or metal.

The collet member 11 includes a first circular collar 18 and a second circular collar 19 interconnected by a body 20. The diameter of collar 18 is greater than the diameter of collar 19. A throughbore 21 is defined through the collet member 11. The diameter of the throughbore 21 is slightly greater than the outer diameter of a plastic tube 32 which is to be inserted in the throughbore 21. Note that the collar 18 has a conical countersink surface 22 to assist in guiding the plastic tube 32 throughbore 21. Throughbore 21 defines a longitudinal axis 23 of the collet member 11.

A series of four equispaced, longitudinal slots 24 are defined in the body 20 parallel to axis 23. Inwardly projecting circumferential barbs 25 are provided on the interior surface of the throughbore 21.

An outward projection 26 is defined on the outside surface of the regular cylindrical body 20 projecting generally transversely to axis 23 and in the same plane as barbs 25. The maximum diameter of the projection 26 is greater than the diameter of collar 19. The projection 26 includes inclined surfaces 27, 28 extending from the outside cylindrical surface of body 20 to a cylindrical surface or land 29.

The ring 21 includes an opening 31 with a diameter slightly greater than the diameter of the lower collar 19. Thus, the lower collar 19 may fit through the opening 31 into a bore 42 defined in fixture or element 30. The bore 42 and member 14 or plate 16 define a large diameter region 33 formed by conical intersecting walls 34 and 35. A cylindrical wall 36 defined on member 14 or plate 16 adjacent wall 34 has a diameter slightly less than that of land 29. A shoulder 37 is defined intermediate opening 31 and detent cylinder wall 36.

The land 29 has a diameter which is greater than that of the opening 31 and shoulder 37. Therefore, upon inserting the collet member 11 through the opening 31 past shoulder 37, the body 20 must elastically deform so that the projection 26 will fit through the opening 31. Upon complete insertion of collet member 11 into ring member 12 the region 33 easily receives the projection 26 without elastic deformation of the body 20. The collet member 11 is thus inserted within the ring member 12 to the position generally shown in FIG. 4. When in this position there is substantially no elastic deformation of the body 20. Also the collet member 11 is sufficiently long enough to permit the collar 18 to project above the opening 31 so that the collar 18 may be manually gripped for axial movement of the collet member 11 with respect to the ring member 12.

Subsequently the tube 32 is inserted into the throughbore 21. As shown in FIG. 4, the tube sits at the bottom of a counterbore 38 and laterally engages an O-ring 39 to facilitate sealing. The barbs 25 lightly grip the tube 32 when it is inserted as shown in FIG. 4. Thus, the tube 32 may be manually inserted in collet member 11 and is removable when the collet member 11 is in the position shown in FIG. 4.

In order to retain the tube 32 in the element 30, the collet member 11 and tube 32 are pulled axially outwardly in unison from the position shown in FIG. 4 to the position shown in FIG. 5. When pulled outwardly to the position shown in FIG. 5, the projections 26 cooperatively engage the detent surface 34 and elastically deform the body 20 driving the barbs 25 inwardly to tightly grip the tube 32. The projections 26 and, more specifically, the land 29 then seats on the planar, conical surface 36 where it remains substantially in a detent position. Note that the collar 19 cooperates with bore 42 to guide the collet member 11 at the lower end while the surfaces 34, 35, 36 forming the region 33 guide the projection 26.

When the tube 32, as shown in FIG. 5, is pulled outwardly, it will be gripped more tightly by the barbs 25 as land 29 is made to ride on shoulder 37. The tube 32 is thus substantially locked in place. Elastic deformation of the body 20 insures retention of the tube 32.

To remove the tube 32, the collet member 11 must be pushed into the position shown in FIG. 4 from the position of FIG. 5. This frees the projections 26 and body 20 from the elastic forces generated by compression of the body 20 when the land 29 is in the detent position on surface 36. Once the collet member 11 and tube 32 are pushed "in" to the position of FIG. 4, the tube 32 may be manually removed as the collet member is manually restrained in the FIG. 4 position.

The ring member 12 may be formed by any of a number of means. It may be integrally formed in an element 30. It may be formed as a press-fit ring 14 which fits into a counterbore 44 defined in element 30 as shown in FIG. 3. It may be formed as part of a plate 16 which fits over an element 30 as shown in FIGS. 4 and 5.

Various other modifications of the invention are also possible without departing from the concepts recited above. Therefore, the invention is to then be limited only by the following claims and their equivalents.

What is claimed is:

1. An improved fitting for releasably retaining tubing, said fitting comprising, in combination:
    a collet member and a cooperating ring member;
    said collet member including two solid circumferential collars connected by flexible elastic elongated body, said body defining a longitudinal axis, said body having an axial throughbore through the body to receive the tubing, an outward projection intermediate the collars, inward barb projections in the throughbore, generally radially opposite said outward projection and said body having means to permit elastic deformation thereof;
    said ring member defining a passage having a circular opening of a first diameter to receive a part of the collet member including one collar, said one collar having a second outer diameter less than the first diameter, said outward projection of the collet member having a diametral outer dimension greater than the first diameter to thereby cause elastical deformation of the collet member body when the projection is inserted through the opening, said ring member including internal means cooperative with the collet member to lock the collet member in the passage and maintain the body in a state of elastic deformation causing a tube inserted in the throughbore of the collet member to be gripped by the barbed projections and retained by the fitting, the ring member also including an internal region with a diametral dimension greater than the diametral dimension of the one collar and the body and providing means to release elastic deformation of the body and permit movement of tubing in the throughbore; the other collar of the collet member not being inserted through the ring member opening whereby the other collar of the collet member may be gripped to move the collet member relative to the ring member.

2. The improved fitting of claim 1 wherein the body of the collet member is generally cylindrical and includes at least one longitudinal slot to facilitate elastic deformation.

3. The improved fitting of claim 1 wherein the second collar has an outer diametral dimension greater than the first diameter.

4. The improved fitting of claim 1 wherein the region of the passage is more distal from the opening in the ring member than said means for cooperation with the outward projection of the collet member.

5. The improved fitting of claim 1 wherein the ring member is integrally formed with a tube receiving passage.

6. The improved fitting of claim 1 wherein the ring member is comprised of separate cooperative members forming the passage.

7. The improved fitting of claim 6 wherein one of the members is a plate with a shaped passage defining part of the ring member.

8. The improved fitting of claim 6 wherein one of the members is an insert member adapted to cooperate with a counterbore of a tube passage in an element or fixture.

9. The improved fitting of claim 1 wherein said body member includes a plurality of longitudinal slots to provide flexibility.

10. The improved fitting of claim 1 wherein said collet member body includes four equally spaced longitudinal slots therethrough.

11. The improved fitting of claim 1 wherein said collet member is generally cylindrical and cooperative with a circular cylindrical passage defined by the ring member.

12. The fitting of claim 9 wherein said slots are equally spaced and parallel to the axis.

* * * * *